Patented June 22, 1926.

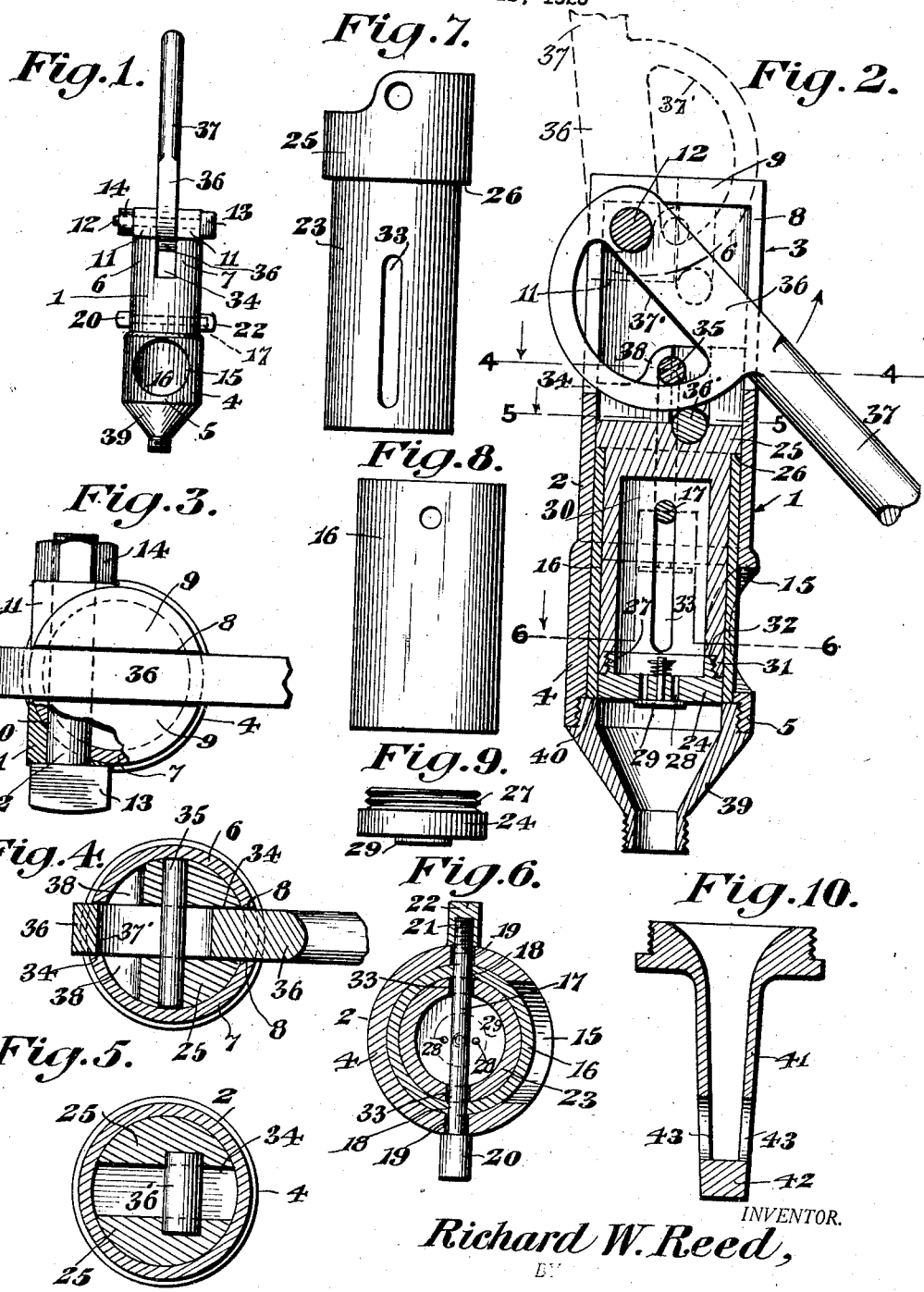

1,590,058

UNITED STATES PATENT OFFICE.

RICHARD WALKER REED, OF WASHINGTON, DISTRICT OF COLUMBIA.

PORTABLE LUBRICANT OR GREASE-CUP FILLER.

Application filed November 11, 1925. Serial No. 68,358.

This invention relates to a portable lubricant or grease cup filler, designed primarily for filling the lubricant or grease cups employed in connection with the bearings between the connecting rods and crank pins of locomotives for which a relatively large body of heavy lubricant or grease is necessary, but it is to be understood that a filling device, in accordance with this invention can be employed for any purposes for which it is found applicable, and the invention has for its object to provide, in a manner as hereinafter set forth, a filling device having a lateral opening for the passage of the lubricant or grease into the device and means within the latter for closing said opening prior to the expelling of the lubricant or grease for filling the lubricant or grease cups to prevent the discharge of the lubricant or grease in a direction other than that towards the cup, thereby preventing waste, and to further provide the device with means for removably connecting it with the cup to be filled, and further with means whereby the body of heavy lubricant or grease can be quickly forced into the cup after the closing of the lateral opening to fill the cup for lubricating purposes.

Further objects of the invention are to provide, in a manner as hereinafter set forth, a portable lubricant or grease cup filler, which is simple in its construction and arrangement, strong, durable, compact, thoroughly efficient and convenient in its use, readily assembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of a filling device, in accordance with this invention.

Figure 2 is a vertical sectional view thereof and further illustrating the operating means for the expelling plunger in full and dotted lines showing respectively the active and inactive position of said operating means.

Figure 3 is a top plan view of the device, partly broken away.

Figure 4 is a section on line 4—4, Figure 2.

Figure 5 is a section on line 5—5, Figure 2.

Figure 6 is a section on line 6—6, Figure 2.

Figure 7 is a side elevation of the expelling plunger.

Figure 8 is an elevation of the sleeve for closing the inlet opening.

Figure 9 is a side elevation of the expelling plunger head.

Figure 10 is a vertical sectional view of a modified form of spud.

A filling device, in accordance with this invention, comprises a tubular body portion referred to generally by the reference character 1 and consisting of a casting formed of an intermediate part 2, an outer end part 3 and an inner end part 4, and the latter has its inner terminus formed with an interiorly threaded annular collar 5 of the same outer diameter as the outer diameter of the part 4 and having its inner diameter greater than the inner diameter of the part 4. The inner diameter of the parts 2, 3 and 4 is the same with respect to each other. The outer end part 3 is formed of two spaced segmental sections 6, 7, thereby providing the outer end of the tubular body portion 1 with a lengthwise extending diametrically disposed slot or passage 8. The outer terminus of each of the sections 6, 7 is formed with an inwardly extending segmental-shaped flange 9. The flanges 9 are oppositely disposed and each has its free edge flush with the lengthwise edges of its respective section.

The outer end part 3 is formed with a pair of opposed openings 10 and each of said openings is formed in a section 6 or 7 in proximity to the inner face of a flange 9. The openings 10 are arranged adjacent the axis of the tubular body portion 1 and positioned against the periphery of the outer end part 3 is a pair of oppositely disposed washer elements 11 having their inner faces conforming to the arc of the periphery of the outer end part 3. The openings formed by the washer elements register with the openings 10. Extending through the washer elements 11 and openings 10 is a pivot bolt 12 provided with a head 13 which abuts against one of the washer elements 11 and further provided with a clamping nut 14, which abuts against the other washer element 11. The bolt 12 is fixedly secured to the outer end part 3 of the tubular body portion 1 and is arranged at the outer end of said part. The function of the bolt 12 will be presently referred to.

The inner end part 4 of the tubular body portion 1 is of greater outer diameter than the outer diameter of the part 2 or part 3, whereby said part 4 is of greater thickness than the other parts of the tubular body portion 1. The thickened part 4 reinforces the inner end of the tubular body portion 1 and said part 4 is formed with a lateral opening 15 providing an inlet for inserting the lubricant or grease into the body portion 1 and which is to be expelled from said body portion into the lubricant receiving cup, not shown. The diameter of the opening 15 is slightly less than the length of the part 4.

Arranged within the tubular body portion 1 and of less length than the length of the latter, is a closure element 16 for the opening 15 and which is of a length slightly less than the combined length of the parts 2 and 4. The element 16 is in the form of a sleeve or bushing and is of an outer diameter to snugly engage the inner face of the tubular body portion 1. The element 16 is shiftable lengthwise with respect to the body portion 1 when moved to and from closure position with respect to the opening 15. The element 16 is manually shifted to and from closure position, through the medium of a rod 17, which extends diametrically of the element 16 and body portion 1 and further extends through a pair of opposed openings 18 formed in the element 16. The rod 17 operates in a pair of opposed, lengthwise extending slots 19 formed in the parts 2 and 4 of the body portion 1.

The element 17 projects from the tubular body portion 1 and has one of its projecting ends in the form of a head 20 and its other projecting end threaded, as at 21, for the reception of a cap nut 22. The head 20 in connection with the nut 22 detachably connects the rod 17 to the tubular body portion 1 and further prevents the rod 17 from shifting diametrically with respect to said body portion 1.

Operating within the tubular body portion 1 and also in the closure element 16 is a lubricant expelling plunger consisting of an intermediate portion 23, an inner end portion 24 and an outer end portion 25. The portions 23 and 25 are tubular in contour and the portion 25 is of greater outer diameter than the portion 23, thereby providing a shoulder 26. The inner end portion 24 of the plunger constitutes a head therefor and it consists of a circular disk provided on its upper or inner face with a peripherally threaded collar 27 positioned inwardly with respect to the edge of the disk. The disk is formed with a plurality of air ports 28 controlled through the medium of a spring controlled valve 29 carried by the disk. The ports 28 and valve 29 are employed to prevent a vacuum on the receding movement of the expelling plunger to prevent the withdrawal of the lubricant or grease after it has been supplied to the lubricant receiving cup.

The intermediate portion 23 is tubular, open at its inner end and formed with an integral closure 30 at its outer end. The inner end of the intermediate portion 23 is reduced, as at 31, and interiorly threaded. The reduced inner end 31 provides an annular shoulder 32 on the inner face of the intermediate portion 23 and against said shoulder abuts the collar 27. The threads on the collar 27 and reduced portion 31 provide means for detachably connecting the inner end portion 24 or plunger head to the intermediate portion 23, and the latter is formed with a pair of lengthwise extending opposed slots 33 through which the rod 17 extends. The slots 33 are adapted to align with the slots 19 of the tubular body portion 1.

The outer end portion 25 of the expelling plunger is formed substantially solid and provided with a diametrically extending groove 34 of the same width as the width of the slots or passages 8, and said groove is adapted to register with the said slots or passages 8. The groove is of less depth than the height of the portion 25 and open at the top of the latter. Extending transversely of the groove 34, and intersecting the vertical median of the portion 25 is a cylindrical pin 35, which is anchored in the portion 25 of the expelling plunger. Mounted in the bottom of the groove 34 to one side of the pin 35 and extending into the groove 34 is a bearing member 36' which extends across said groove 34 and is spaced a substantial distance from the pin 35. The pin 35 provides a guide and the member 36' a bearing for the operating means to be presently referred to, for the expelling plunger. The slots or passages 8 and groove 34 provide clearances for the operating means for the expelling plunger.

The operating means for the expelling plunger consists of a substantially semi-oval shaped cam 36 provided with a segment-shaped opening 37'. The cam 36 is pivotally mounted on the bolt 12 and rides between the pin 35 and bearing 36'. Formed integral with the cam 36 is a handle member 37. When the cam 36 is shifted to full line position shown in Figure 2, the expelling plunger is forced to the position shown in Figure 2, and when the cam 36 is shifted to the dotted line position Figure 2, the expelling plunger is withdrawn as indicated in dotted lines in Figure 2. The top of the portion 25 of the expelling plunger is cut away, as at 38, to provide a clearance for the bolt 12 when the expelling plunger is moved from active position that is to say to the position shown in dotted lines in Figure 2.

Detachably connected to the collar 5 is a spud 39 adapted to be removably connected to the lubricant receiving cup, and said spud 39 directs the expelled lubricant to such cup. The inner diameter at the outer or upper end of the spud 39 is the same as the outer diameter of the expelling plunger and by this arrangement the spud projects inwardly from the inner end part 4 of the tubular body portion 1 and provides a seat 40 for the closure element 16 when the latter is shifted to close the opening 15. The top edge of the element 16 coacts with the shoulder 26 of the expelling plunger for limiting or arresting the expelling action thereof.

With respect to Figure 10, a modified form of spud is indicated at 41 and which is closed at its inner end, as at 42, and formed with a pair of lateral openings 43 in proximity to the closed end 42, to provide for the lateral discharge of the lubricant expelled from the filling device. The spud 41 is adapted to be connected to the collar 5 and provides a seat for the closure element 16.

It will be assumed that the expelling plunger is in dotted line position as shown in Figure 2 and when the plunger is shifted to such position, the element 16 is carried therewith. When the parts are in such position the lubricant is inserted through the opening 15, after which the element 16 is shifted through the medium of the rod 17 to the position shown in Figure 2 to close the inlet. The expelling plunger is then operated through the medium of the cam in a downward direction for the purpose of forcing the lubricant into the cup or at any other desirable point. As the rod 17 extends through the slots in the plunger the closure element 17 is not shifted by the plunger when the latter is shifted in either direction by its operating means.

It is thought the many advantages of a lubricant expelling device, in accordance with this invention, can be readily understood, and although the preferred embodiment of the invention is as illustrated and described, yet it is to be understood that changes in the details of construction can be had which will fall within the scope of the invention as claimed.

What I claim is:—

1. A lubricant expelling device comprising a tubular body portion provided with a lateral inlet for supplying lubricant thereto, an expelling plunger operating in said body portion, and a tubular shiftable closure element for said inlet arranged completely within said body portion, said element operated independent of said plunger and surrounding the latter when the plunger is moved to active position.

2. A lubricant expelling device comprising a tubular body portion provided with a lateral inlet for supplying lubricant thereto, an expelling plunger operating in said body portion, a tubular shiftable closure element for said inlet arranged completely within said body portion, said element operated independent of said plunger and surrounding the latter when the plunger is moved to active position, and a cam element pivotally connected to said body portion and slidably connected with said plunger for operating the latter lengthwise in both directions with respect to said body portion.

3. A lubricant expelling device comprising a tubular body portion provided with a lateral inlet for supplying lubricant thereto, an expelling plunger operating in said body portion, a tubular shiftable closure element for said inlet arranged completely within said body portion, said element operated independent of said plunger and surrounding the latter when the plunger is moved to active position, and said plunger provided with means to prevent the formation of a vacuum when the plunger is moved to inactive position.

4. A lubricant expelling device comprising a tubular body portion provided with a lateral inlet for supplying lubricant thereto, an expelling plunger operating in said body portion, a tubular shiftable closure element for said inlet arranged completely within said body portion, said element operated independent of said plunger and surrounding the latter when the plunger is moved to active position, a cam element pivotally connected to said body portion and slidably connected with said plunger for operating the latter lengthwise in both directions with respect to said body portion, and said plunger provided with means to prevent the formation of a vacuum when the plunger is shifted from active position.

5. A lubricant expelling device comprising a tubular body portion provided with a lateral inlet for supplying lubricant thereto, an expelling plunger operating in said body portion, a closure element for said inlet, said element operated independent of said plunger and surrounding the latter when the plunger is moved to active position, said plunger provided with means to prevent the formation of a vacuum when the plunger is moved to inactive position, and a shifting rod for said element, said rod extending through said body portion, element and plunger, and said element and plunger being slotted to provide clearances for the rod.

6. A lubricant expelling device comprising a tubular body portion provided with a lateral inlet for supplying lubricant thereto, an expelling plunger operating in said body portion, a closure element for said inlet, said element operated independent of said plunger and surrounding the latter when the plunger is moved to active position, a cam element pivotally connected to said body portion and slidably connected with said plunger for operating the latter lengthwise in both directions with respect to said body portion, said plunger provided with means to prevent the formation of a vacuum when the plunger is shifted from active position, and a shifting rod for said element, said rod extending through said body portion, element and plunger, and said element and plunger being slotted to provide clearances for the rod.

7. A lubricant expelling device comprising a tubular body portion provided with a lateral inlet for supplying lubricant thereto, an expelling plunger operating in said body portion, a closure element for said inlet, said element operated independent of said plunger and surrounding the latter when the plunger is moved to active position, and a spud element projecting from the inner end of said body portion and providing a seat for the closure element when the latter is shifted to closing position with respect to said inlet.

8. A lubricant expelling device comprising a tubular body portion provided with a lateral inlet for supplying lubricant thereto, an expelling plunger operating in said body portion, a closure element for said inlet, said element operated independent of said plunger and surrounding the latter when the plunger is moved to active position, a cam element pivotally connected to said body portion and slidably connected with said plunger for operating the latter lengthwise in both directions with respect to said body portion, and a spud element projecting from the inner end of said body portion and providing a seat for the closure element when the latter is shifted to closing position with respect to said inlet.

9. A lubricant expelling device comprising a tubular body portion provided with a lateral inlet for supplying lubricant thereto, an expelling plunger operating in said body portion, a closure element for said inlet, said element operated independent of said plunger and surrounding the latter when the plunger is moved to active position, said plunger provided with means to prevent the formation of a vacuum when the plunger is moved to inactive position, and a spud element projecting from the inner end of said body portion and providing a seat for the closure element when the latter is shifted to closing position with respect to said inlet.

10. A lubricant expelling device comprising a tubular body portion provided with a lateral inlet for supplying lubricant thereto, an expelling plunger operating in said body portion, a closure element for said inlet, said element operated independent of said plunger and surrounding the latter when the plunger is moved to active position, a cam element pivotally connected to said body portion and slidably connected with said plunger for operating the latter lengthwise in both directions with respect to said body portion said plunger provided with means to prevent the formation of a vacuum when the plunger is shifted from active position, and a spud element projecting from the inner end of said body portion and providing a seat for the closure element when the latter is shifted to closing position with respect to said inlet.

In testimony whereof, I affix my signature hereto.

RICHARD WALKER REED.